(12) United States Patent
Nagasaku

(10) Patent No.: US 11,082,102 B2
(45) Date of Patent: Aug. 3, 2021

(54) BEAM FORMING ANTENNA

(71) Applicant: Hitachi Kokusai Electric Inc., Tokyo (JP)

(72) Inventor: Toshiyuki Nagasaku, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/643,922

(22) PCT Filed: Sep. 7, 2018

(86) PCT No.: PCT/JP2018/033212
§ 371 (c)(1),
(2) Date: Mar. 3, 2020

(87) PCT Pub. No.: WO2019/065158
PCT Pub. Date: Apr. 4, 2019

(65) Prior Publication Data
US 2021/0067217 A1    Mar. 4, 2021

(30) Foreign Application Priority Data

Sep. 28, 2017 (JP) .............................. JP2017-187319

(51) Int. Cl.
*H04B 7/06* (2006.01)
*H04W 72/04* (2009.01)

(52) U.S. Cl.
CPC ......... *H04B 7/0617* (2013.01); *H04B 7/0634* (2013.01); *H04W 72/046* (2013.01)

(58) Field of Classification Search
CPC .... H04B 7/0619; H04B 7/063; H04B 7/0632; H04B 7/0868; H04B 7/088; H04W 72/046; H04W 72/06; H04W 72/0413
See application file for complete search history.

(56) References Cited

U.S. PATENT DOCUMENTS 4,228,436 A     10/1980  Dufort
4,455,536 A  *  6/1984  Stegens ..................... H03F 3/26
                                                                330/118
(Continued)

FOREIGN PATENT DOCUMENTS

JP     62-005704 A     1/1987
JP     02-302102 A    12/1990
(Continued)

OTHER PUBLICATIONS

International Search Report of PCT/JP2018/033212 dated Nov. 13, 2018.

*Primary Examiner* — Siu M Lee
(74) *Attorney, Agent, or Firm* — Mattingly & Malur, PC

(57) ABSTRACT

A beam forming antenna in which directivity directions of beams can be controlled at higher resolution of control is provided. The beam forming antenna includes a matrix circuit having multiple final output terminals and multiple antenna elements connected to the multiple final output terminals respectively. The matrix circuit includes a first sub-matrix, a second sub-matric, and adders which combine outputs of the first sub-matrix and outputs of the second sub-matrix. By selecting any input terminal out of the multiple input terminals of the first sub-matrix or the multiple input terminals of the second sub-matrix and inputting a signal, a signal having a predetermined phase difference between output terminals is output at the multiple final output terminals and the phase difference between output terminals has a differing value according to a selected input terminal.

3 Claims, 14 Drawing Sheets

(56) References Cited

U.S. PATENT DOCUMENTS

| | | | |
|---|---|---|---|
| 5,233,358 A | 8/1993 | Murphy | |
| 6,208,294 B1 | 3/2001 | Kobayakawa et al. | |
| 6,650,910 B1 * | 11/2003 | Mazur | H04B 7/086 455/562.1 |
| 2010/0115378 A1 * | 5/2010 | Gander | H03M 13/6502 714/776 |
| 2014/0285284 A1 * | 9/2014 | Kim | H01P 1/184 333/117 |
| 2018/0332372 A1 * | 11/2018 | Liu | H04B 10/5161 |
| 2020/0028556 A1 * | 1/2020 | Inoue | H04B 7/0695 |
| 2020/0313294 A1 * | 10/2020 | Morita | H01Q 1/24 |

FOREIGN PATENT DOCUMENTS

| | | |
|---|---|---|
| JP | 2000-091833 A | 3/2000 |
| JP | 2001-524773 A | 12/2001 |
| JP | 2016-111605 A | 6/2016 |
| WO | 2016/080087 A1 | 5/2016 |

* cited by examiner (A)

<u>31A</u>

(B)

| INPUT TERMINAL | PHASE DIFFERENCE BETWEEN OUTPUT TERMINALS |
|---|---|
| IN1 | −45° |
| IN2 | 135° |
| IN3 | −135° |
| IN4 | 45° |

(A)

(B)

| INPUT TERMINAL | PHASE DIFFERENCE BETWEEN OUTPUT TERMINALS |
|---|---|
| IN1 | -22.5 |
| IN2 | 157.5 |
| IN3 | -112.5 |
| IN4 | 67.5 |
| IN5 | -67.5 |
| IN6 | 112.5 |
| IN7 | -157.5 |
| IN8 | 22.5 |

(A)

(B)

| INPUT TERMINAL | PHASE DIFFERENCE BETWEEN OUTPUT TERMINALS |
|---|---|
| IN1-1 | -22.5 |
| IN1-2 | 157.5 |
| IN1-3 | -112.5 |
| IN1-4 | 67.5 |
| IN2-1 | -67.5 |
| IN2-2 | 112.5 |
| IN2-3 | -157.5 |
| IN2-4 | 22.5 |

FIG.10D

| INPUT TERMINAL | PHASE DIFFERENCE BETWEEN OUTPUT TERMINALS |
|---|---|
| IN1-1 | -11.25 |
| IN1-2 | 168.75 |
| IN1-3 | -101.25 |
| IN1-4 | 78.75 |
| IN1-5 | -56.25 |
| IN1-6 | 123.75 |
| IN1-7 | -146.25 |
| IN1-8 | 33.75 |
| IN2-1 | -33.75 |
| IN2-2 | 146.25 |
| IN2-3 | -123.75 |
| IN2-4 | 56.25 |
| IN2-5 | -78.75 |
| IN2-6 | 101.25 |
| IN2-7 | -168.75 |
| IN2-8 | 11.25 |

BEAM FORMING ANTENNA

TECHNICAL FIELD

The present invention relates to a beam forming antenna and relates to a beam forming antenna that is configured using, e.g., a Butler matrix.

BACKGROUND ART

In a device that transmits and receives electromagnetic waves using an antenna such as a wireless device and a radar device, an array antenna that orients beam directivity toward a desired direction using multiple antenna elements is commonly used. Because radio frequency signals, particularly, in a quasi-millimeter wave band or a millimeter wave band, experience a large propagation loss, it is commonly practiced to obtain a high antenna gain using an array antenna and, thereby, compensate for the propagation loss. However, a high antenna gain causes a beam that is radiated from an antenna to have sharp directivity. Therefore, in a case where a communication device is to communicate with correspondent nodes existing in a wide coverage or in a case where objects to be detected by a radar device exist in a wide area, a beam forming antenna is used that controls the phase and amplitude of a signal that is fed to an antenna element and changes a directivity direction of a beam according to situations.

A beam forming antenna is described, e.g., in Patent Literature (PTL) 1. Furthermore, there is a beam forming antenna configured using a Butler matrix (e.g., PTL 2).

CITATION LIST

Patent Literature

PTL 1: Japanese Patent Application Laid-Open No. 2016-111605
PTL 2: Japanese Patent Application Laid-Open No. 2000-91833

SUMMARY OF INVENTION

Technical Problem

Because controllable directivity directions of beams are determined by the number of antenna elements in a beam forming antenna using Butler matrix, once the number of antennas required to make forms of beams necessary for a device has been determined, it is impossible to control directivity directions more precisely than a resolution of control of directivity determined by the number of antenna elements.

The present invention is intended to provide a beam forming antenna in which directivity directions of beams can be controlled at higher resolution of control.

Solution to Problem

A representative aspect of the present invention is briefly outlined as below. That is, a beam forming antenna includes a matrix circuit having multiple final output terminals and multiple antenna elements connected to the multiple final output terminals respectively. The matrix circuit includes a first sub-matrix which is a Butler matrix having multiple input terminals and multiple output terminals, a second sub-matrix which is a Butler matrix having multiple input terminals and multiple output terminals, and adders which combine outputs of the first sub-matrix and outputs of the second sub-matrix. By selecting any input terminals out of the multiple input terminals of the first sub-matrix or the multiple input terminals of the second sub-matrix and inputting a signal, a signal having a predetermined phase difference between output terminals is output at the multiple final output terminals and the phase difference between output terminals has a differing value according to a selected input terminal.

Advantageous Effects of Invention

According to the present invention, it is made possible to control directivity directions of a beam forming antenna at higher resolution.

BRIEF DESCRIPTION OF DRAWINGS

FIG. 10D is a diagram representing a relation between an input terminal that is selected and a phase difference produced between output terminals when the selection was made with regard to the Butler matrix in FIG. 10A.

DESCRIPTION OF EMBODIMENTS

Explanations are provided about beam forming antennas by technology (comparison examples) examined by the present inventors before the present application.

Figure 2:
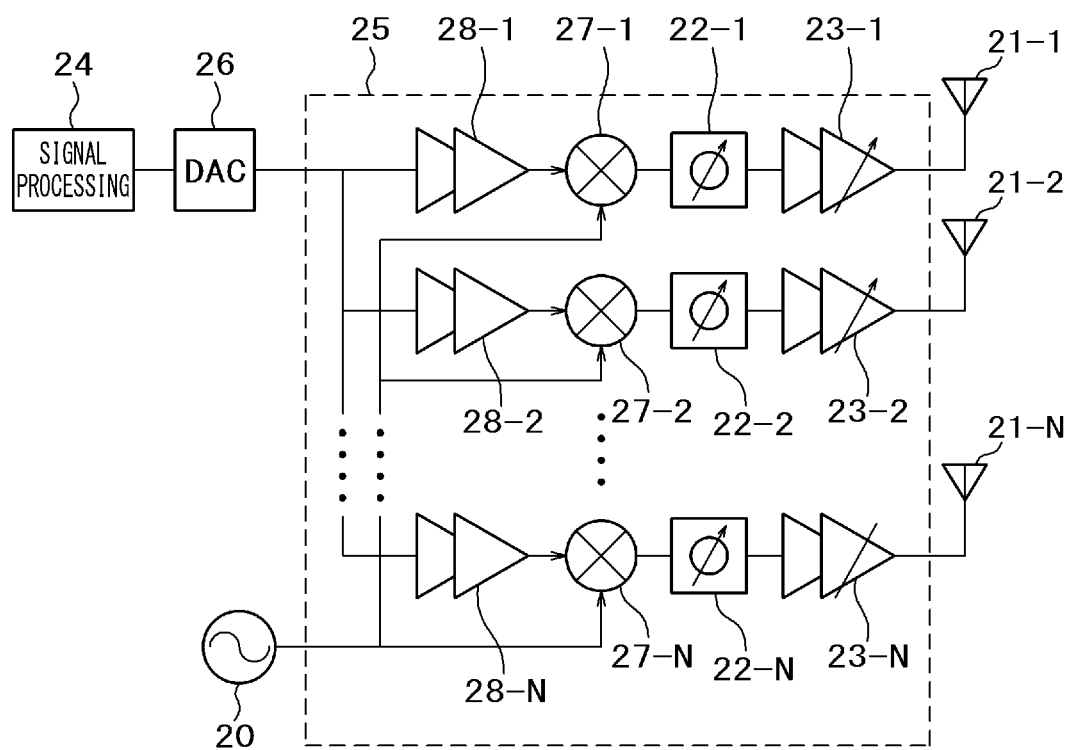
FIG. 2 is a diagram depicting an example of a configuration of a beam forming antenna using phase shifters.
Figure 3:
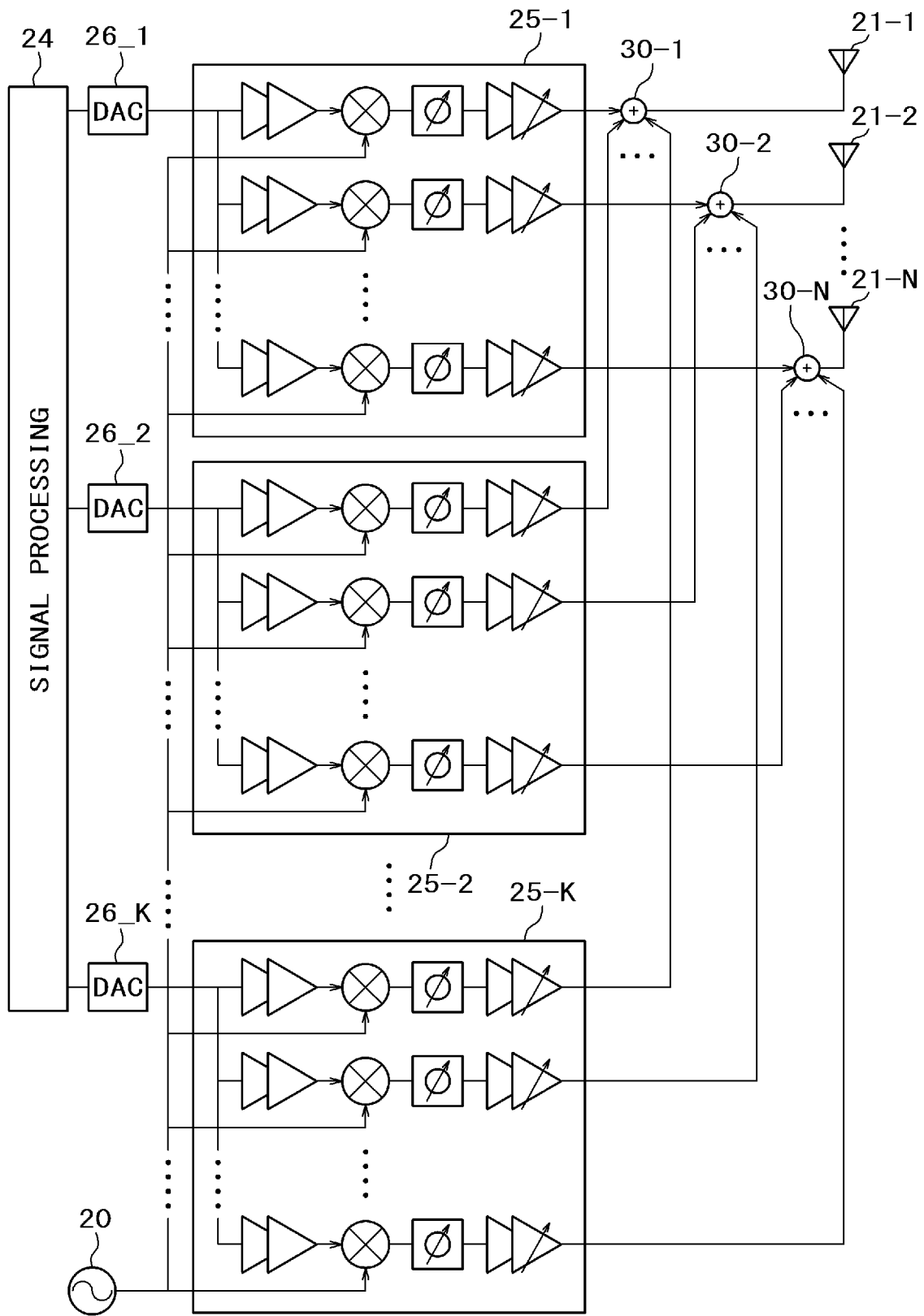
FIG. 3 is a diagram depicting an example of a configuration of a beam forming antenna in a case where the antenna radiates beams in different multiple directions.
Figure 4:
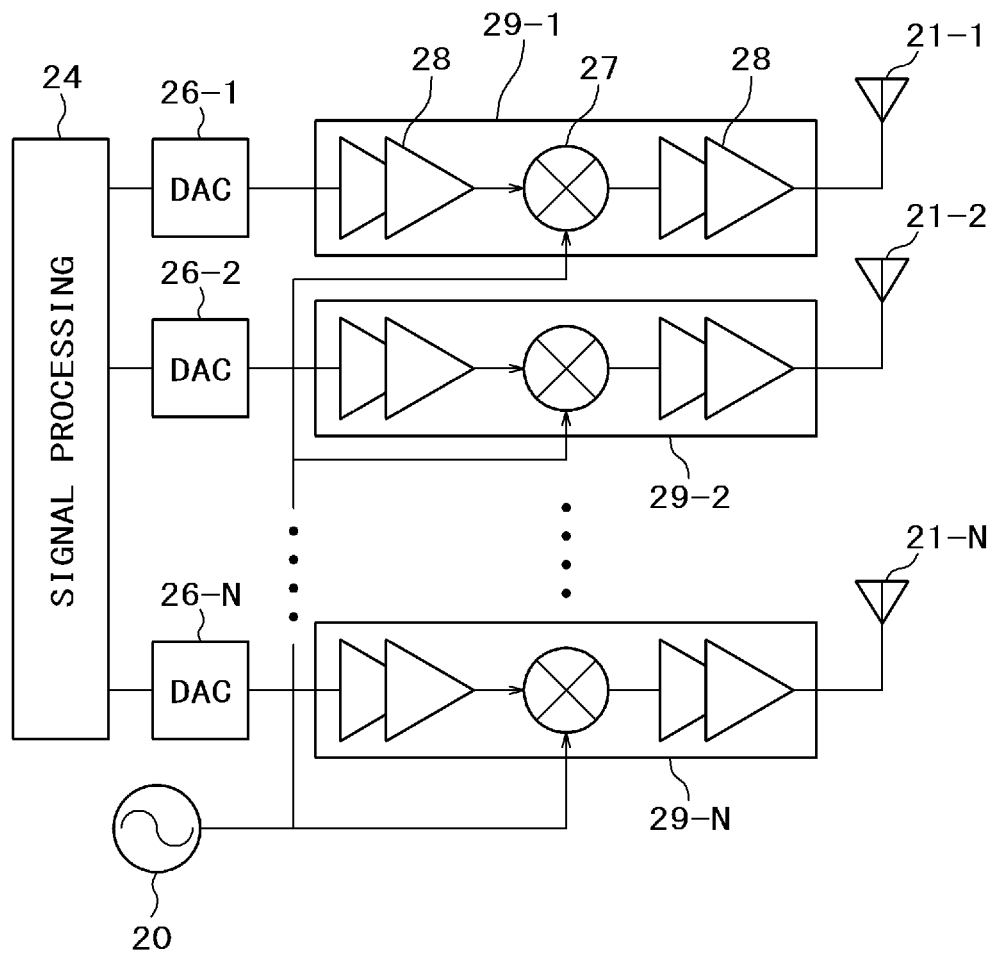
FIG. 4 is a diagram depicting an example of a configuration of a beam forming antenna without using analog phase shifters.

Examples of circuitry for implementing beam forming antennas and their functionality are first described with FIGS. 2 to 4. FIG. 2 is a diagram depicting an example of a configuration of a beam forming antenna using phase shifters. FIG. 3 is a diagram depicting an example of a configuration of a beam forming antenna in a case where the antenna radiates beams in different multiple directions. FIG. 4 is a diagram depicting an example of a configuration of a beam forming antenna without using analog phase shifters.

In the beam forming antenna in FIG. 2, a transmitting circuit 25 including individual variable phase shifters 22-1 to 22-N and variable gain elements 23-1 to 23-N is connected to electrical feeding paths to multiple antenna elements 21-1 to 21-N, and a signal into which beams radiated from the respective antenna elements are combined is controlled to be oriented toward a desired direction by appropriating setting the phases of the variable phase shifters 22-1 to 22-N and the amplitudes of the variable gain elements 23-1 to 23-N to desired values.

In an example of FIG. 2, the variable phase shifters 22-1 to 22-N are inserted into the paths at a point after a signal that has been input through a signal processing circuit 24 and a DA converter (DAC) 26 has been converted to a radio frequency signal by mixers 27-1 to 27-N using a carrier from a carrier generating circuit 20.

By the way, there is a need for a communication device to have more capacity for communication enough to communicate with multiple correspondent nodes at the same time. When such a device transmits individual pieces of data to the respective correspondent nodes, the device needs to transmit different pieces of data at the same time to the multiple correspondent nodes existing in different directions. However, it is impossible for the beam forming antenna as in FIG. 2 to transmit signals in multiple directions at the same time, because a common phase shift is superimposed in the variable phase shifters 22-1 to 22-N even though the signal processing circuit 24 generates multiple pieces of data.

In order to cope with this problem, for example, as in FIG. 3, a method is conceivable that includes preparing transmitting circuits 25 (25-1 to 25-K) as many as a foreseeable maximum number (K) of directions of transmission and superimposing phase shifts to the respective signals individually through the use of adders 30-1 to 30-N. Nevertheless, a configuration like this has a problem in which circuitry size will increase greatly as the foreseeable maximum number (K) of directions of transmission increases.

As another method different than this, a method is conceivable in which analog phase shifters are not used, as in FIG. 4, and transmitting circuits 29-1 to 29-N which are connected to respective antennas are connected to a signal processing circuit 24 via DA converters 26-1 to 26-N individually. Now, each of the transmitting circuits 29-1 to 29-N is comprised of gain elements 28 and a mixer 27. In this method, pieces of data to transmit to different correspondent nodes and phase shift amounts required to orient directivity toward directions in which these correspondent nodes exist are generated and superimposed in the signal processing circuit 24. In this method, required processing is performed in the signal processing circuit and, therefore, the degree of freedom is high and advanced processing is possible. Nevertheless, because the signal processing circuit 24 needs to perform processing for all signals to be radiated from the respective antenna elements 21-1 to 21-N, there is a problem in which the circuitry size of the signal processing circuit will increase greatly in a device having a large number of antenna elements. Particularly, increase in the circuitry size of the signal processing circuit becomes a large problem for a communication device like a base station for cellular telephony, since, for such device, a technology has lately been considered to increase the degree of freedom in the forms of beams which are radiated from antennas by using a very great number of antenna elements, thereby speeding up communication and increasing the number of terminals accommodated in such device.

Figure 5:
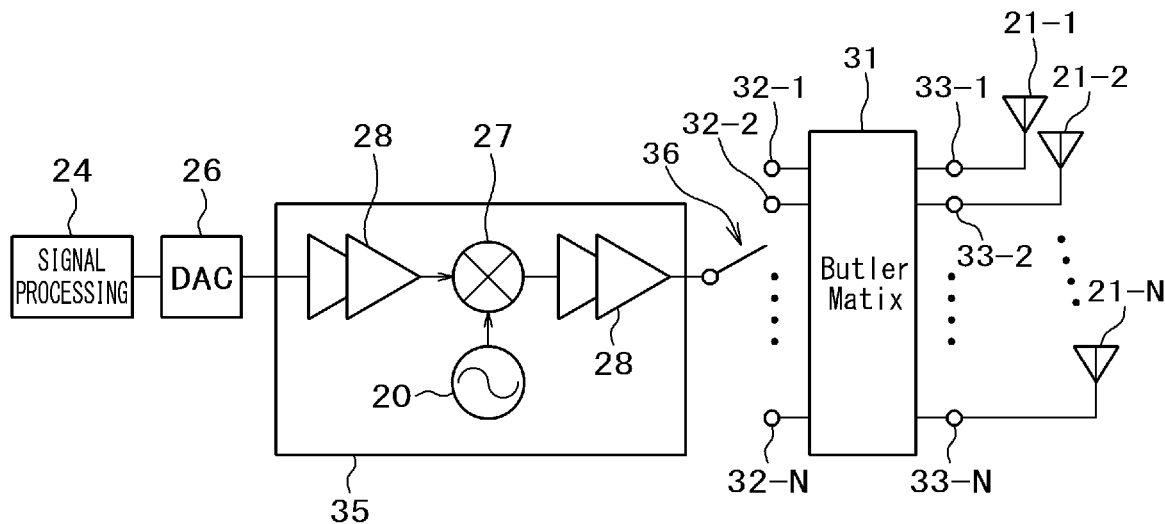
FIG. 5 is a diagram depicting an example of a configuration of a beam forming antenna using a Butler matrix.

As another beam forming antenna different than in FIG. 2 and FIG. 4, a beam forming antenna is described with FIG. 5; it uses a Butler matrix to control a phase difference occurring between multiple output terminals by selecting a terminal to which signals should be input from among multiple input terminals. FIG. 5 is a diagram depicting an example of a configuration of a beam forming antenna using a Butler matrix.

As depicted in FIG. 5, the butler matrix 31 is a circuit having multiple input terminals 32-1 to 32-N and multiple output terminals 33-1 to 33-N, and the output terminals 33-1 to 33-N are connected to respective antenna elements 21-1 to 21-N of an array antenna. In this beam forming antenna, using a switch 36 or the like, selection is made of one terminal to which output signals of a transmitting circuit 35 should be input from the multiple input terminals 32-1 to 32-N. The signals input to any one of the multiple input terminals 32-1 to 32-N are distributed within the Butler matrix 31 and the signals are output from the output terminals 33-1 to 33-N. Also, the transmitting circuit 35 is comprised of a carrier generating circuit 20, gain elements 28, and a mixer 27. When being output from the Butler matrix, the signals are output after being adjusted so that a phase difference of the signals between each of the output terminals will be a desired phase difference. Furthermore, the Butler matrix 31 is configured so that the above phase difference between each of the output terminals will be a different value depending on a selected input terminal.

Figure 6:
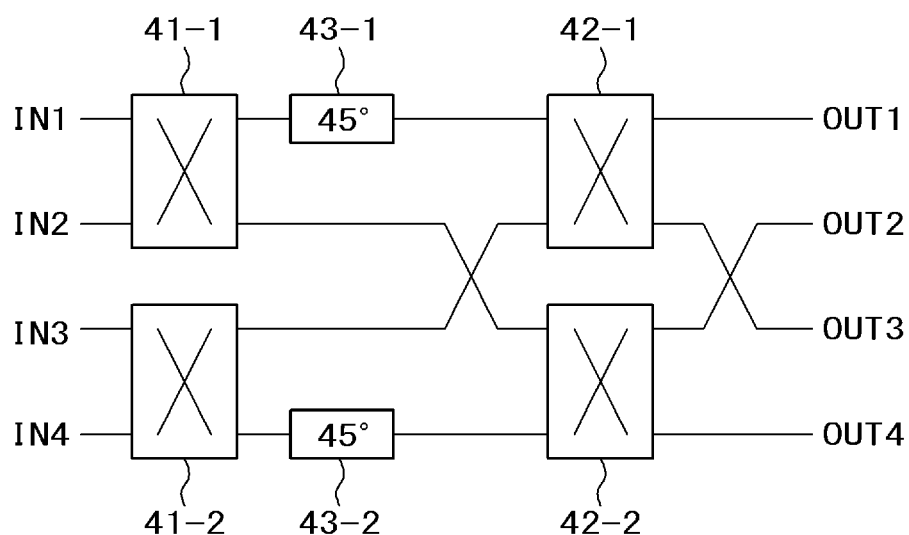
FIG. 6 is a diagram depicting an example of a configuration of a Butler matrix having four input and output terminals.

A Butler matrix having four input terminals and four output terminals is described with FIG. 6. FIG. 6(A) is a diagram depicting an example of a configuration of a Butler matrix having four input and output terminals, and FIG. 6(B) is a diagram representing a relation between an input terminal that is selected and a phase difference between output terminals when the selection was made.

The Butler matrix 31A is comprised of 3 dB hybrid combiners 41-1, 41-2, 42-1, 42-2 and fixed phase shifters 43-1, 43-2. The 3 dB hybrid combiners 41-1, 41-2, 42-1, 42-2 each have a phase shift of 90 degrees between output terminals of each one. The fixed phase shifters 43-1, 43-2 are 45-degree phase shifters. According to the configuration as depicted in FIG. 6(A), a phase difference between output terminals of signals that are output to output terminals OUT1 to OUT4 will be a different value depending on an input terminal selected from among multiple input terminals IN1 to IN4. As presented in FIG. 6(B), it is possible to implement control of phase differences on a per-90-degree basis in a range from −135 degrees to +135 degrees for a phase difference between the output terminals in the Butler matrix 31A with four input terminals and output terminals respectively.

Figure 7:
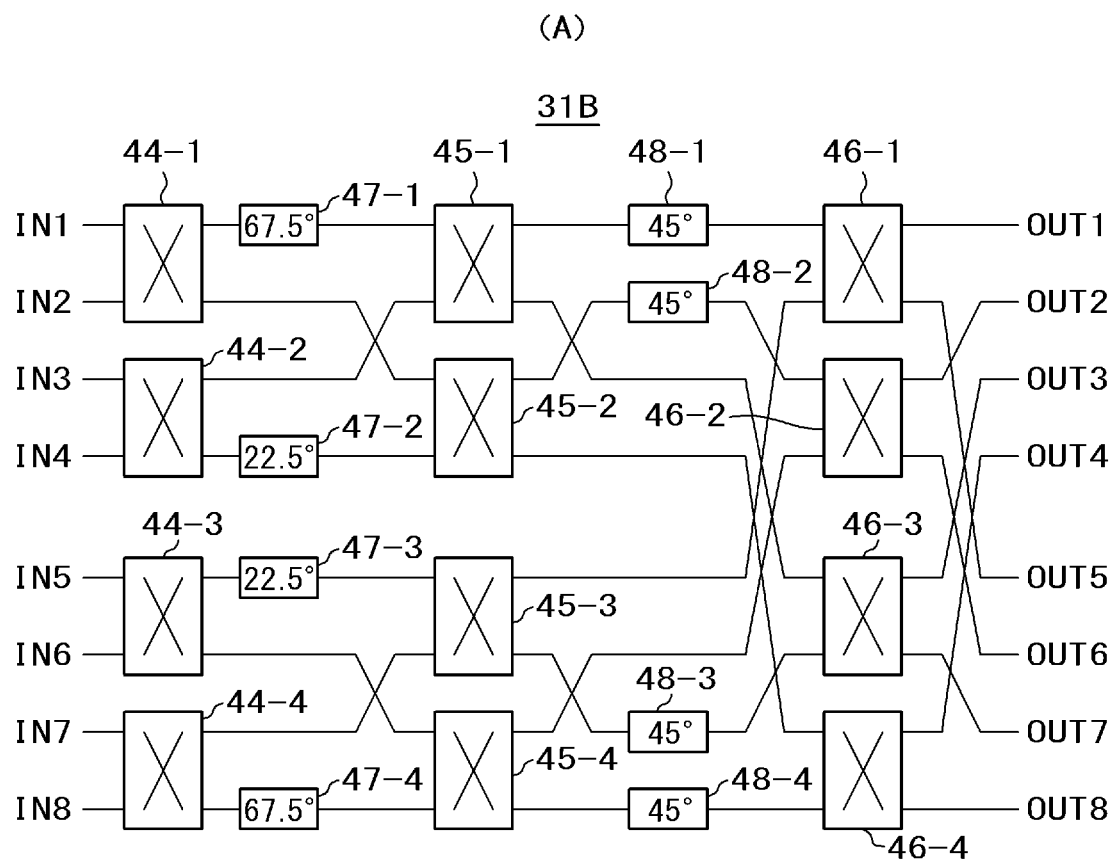
FIG. 7 is a diagram depicting an example of a configuration of a Butler matrix having eight input and output terminals.

Then, a Butler matrix with eight input terminals and output terminals respectively is described with FIG. 7. FIG. 7(A) is a diagram depicting an example of a configuration of a Butler matrix having eight input and output terminals, and FIG. 7(B) is a diagram representing a relation between an input terminal that is selected and a phase difference between output terminals when the selection was made.

The Butler matrix 31B with eight input and output terminals is also comprised of 3 dB hybrid combiners 44-1 to 44-4, 45-1 to 45-4, 46-1 to 46-4, and fixed phase shifters 47-1 to 47-4, 48-1 to 48-4. The 3 dB hybrid combiners 44-1 to 44-4, 45-1 to 45-4, 46-1 to 46-4 each have a phase shift of 90 degrees between output terminals of each one. Fixed phase shifters 47-1, 47-4 are 67.5-degree phase shifters, fixed phase shifters 47-2, 47-3 are 22.5-degree phase shifters, and fixed phase shifters 48-1 to 48-4 are 45-degree phase shifters. As presented in FIG. 7(B), it is possible to implement control of phase differences on a per-45-degree basis in a range from −157.5 degrees to +157.5 degrees for a phase difference between the output terminals in the Butler matrix 31B having eight input and output terminals respectively.

A beam forming antenna using a Butler matrix is comprised of 3 dB hybrid combiners and fixed phase shifters and dispenses with a variable phase shifter or the like. In addition, this antenna is configured in a comparatively simple configuration, which is a merit, because a single transmitting circuit which is comprised of an amplifier, a mixer, etc. is just needed in an array antenna having multiple antenna elements.

Figure 8:
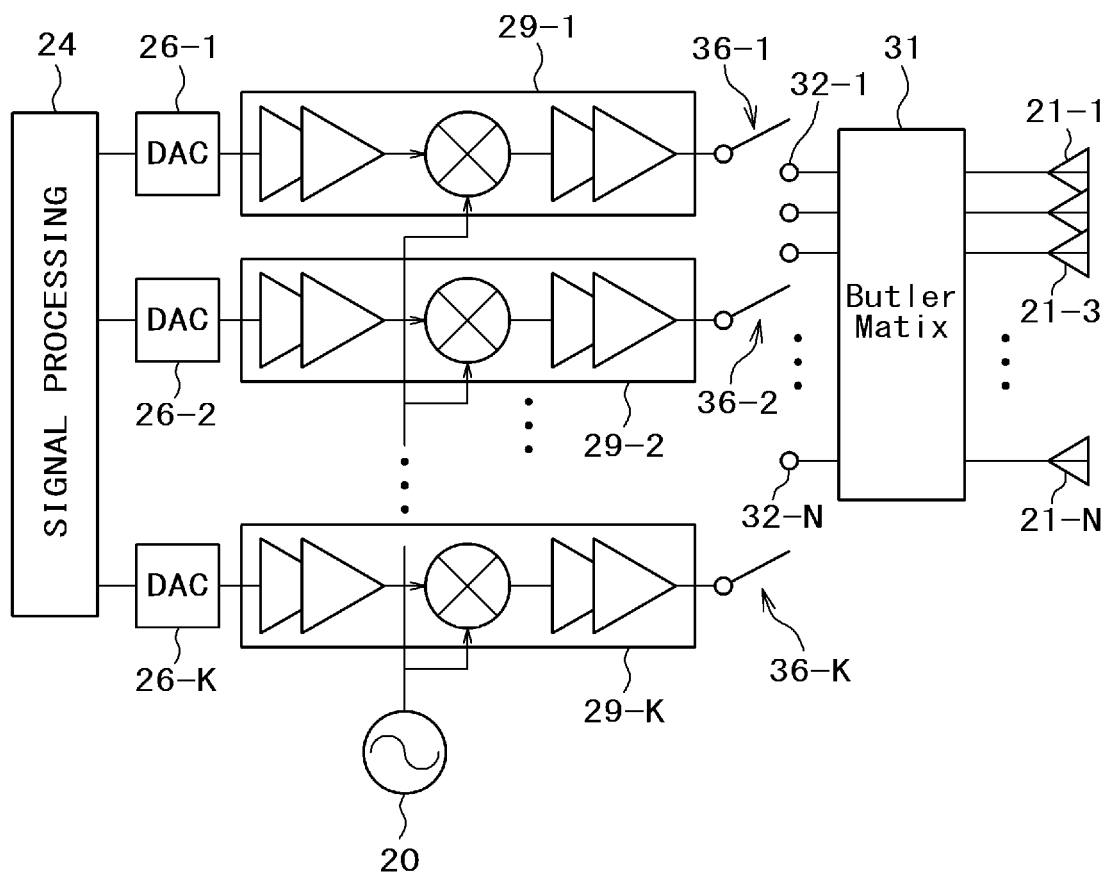
FIG. 8 is a diagram depicting an example of a configuration of a beam forming antenna using a Butler matrix in a case where the antenna radiates beams in different multiple directions.

FIG. 8 is a diagram depicting an example of a configuration of a beam forming antenna using a Butler matrix in a case where the antenna radiates beams in different multiple directions.

Now, the beam forming antenna using the Butler matrix 31 is even capable of transmitting signals in multiple directions at the same time by inputting multiple transmission signals generated in a signal processing circuit 24 to the Butler matrix 31 respectively via DA converters 26-1 to 26-K and transmitting circuits 29-1 to 29-K and using switches 36-1 to 36-K, as in FIG. 8. In this case also, as many transmitting circuits 29-1 to 29-K as a foreseeable maximum number (K) of directions of transmission are required; nevertheless, each of the transmitting circuits can be realized in a simple circuit structure, as compared with the comparison example in FIG. 3 where, inter alia, analog phase shifters are used.

As described previously, a beam forming antenna using a Butler matrix has an advantage that it can control directivity of beams to be radiated from the antenna in a relatively simple structure without using variable phase shifters among others.

Meanwhile, a Butler matrix has a characteristic that feasible phase differences between output terminals are determined by its configuration, as is apparent from the configurations in FIG. 6 and FIG. 7. That is, in the configuration having four input and output terminals in FIG. 6, it is possible to implement control of phase differences on a per-90-degree basis according to a selected input terminal; in the configuration having eight input and output terminals in FIG. 7, it is possible to implement control of phase differences on a per-45-degree basis. Because the output terminals are connected to antenna elements respectively, when the number of antenna elements in the beam forming antenna is determined, a resolution of controllable phase differences between antenna elements will automatically be determined. Because directivity directions of beams to be radiated from a beam forming antenna are determined by the phase differences between antenna elements, when the number of antenna elements is determined, controllable directivity directions of beams are determined. Because forms of beams which are radiated from the beam forming antenna are determined particularly by the number of antenna elements and a way of arranging them, when the number of antenna elements required to realize the forms of beams necessary for a device has been determined, a problem arises if the resolution of control of directivity directions that can be realized by the number of antenna elements is not sufficient.

Figure 1:
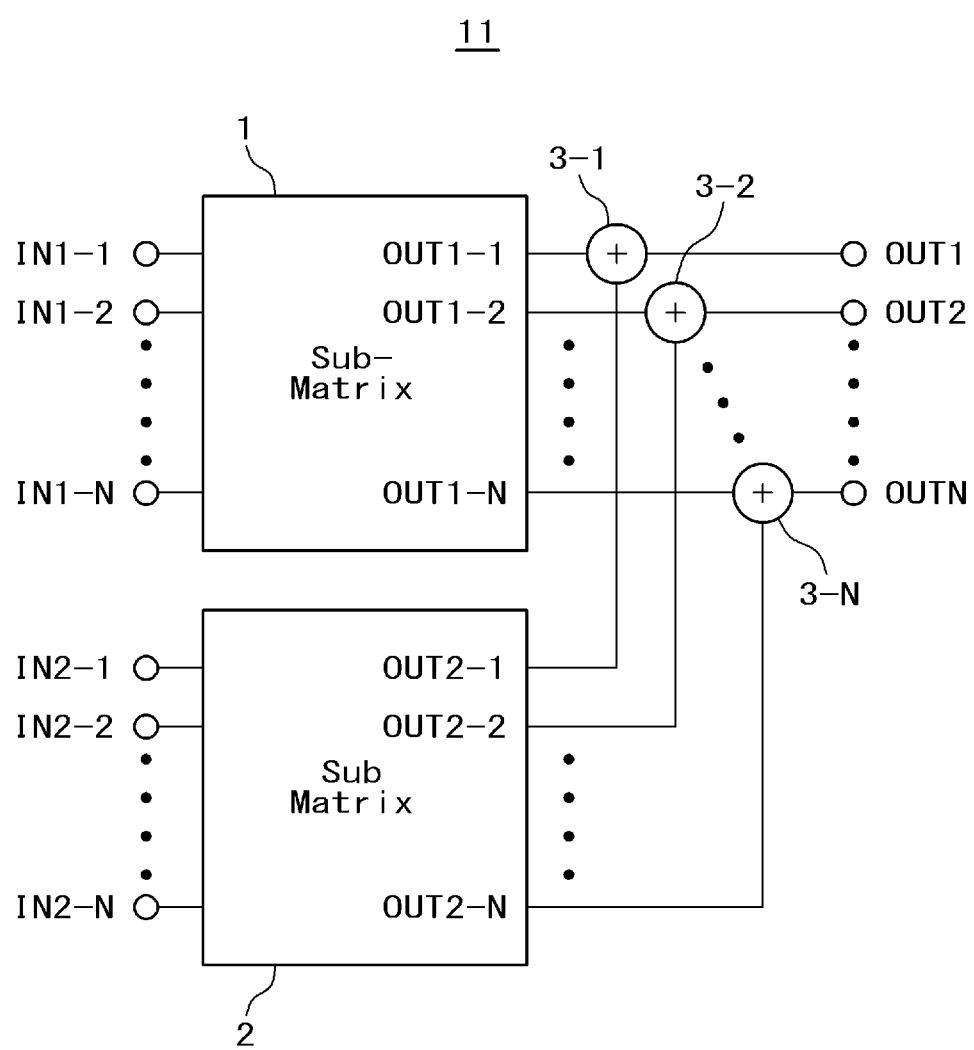
FIG. 1 is a diagram depicting a configuration of a Butler matrix of an embodiment herein.

To solve the problem with the foregoing comparison examples, as depicted in FIG. 1, a Butler matrix 11 in the embodiment is configured such that it includes two sub-matrices, a first sub-matrix 1 and a second sub-matrix 2, and their outputs are combined by adders 3-1 to 3-N. Input terminals IN1-1 to IN1-N of the first sub-matrix 1 and input terminals IN2-1 to IN2-N of the second sub-matrix 2 are equal in number. Also, output terminals OUT1-1 to OUT1-N of the first sub-matrix 1 and output terminals OUT2-1 to OUT2-N of the second sub-matrix 2 are equal in number. Output signals from output terminals of the sub-matrices in corresponding positions in order are combined by the adders 3-1 to 3-N which, in turn, output signals to final output terminals OUT1 to OUTN.

Upon selecting any input terminal of the input terminals IN1-1 to IN1-N of the first sub-matrix 1, a signal having a desired phase difference is generated at the output terminals OUT1-1 to OUT1-N of the first sub-matrix 1. Likewise, upon selecting any input terminal of the input terminals IN2-1 to IN2-N of the second sub-matrix 2, a signal having a desired phase difference is output at the output terminals OUT2-1 to OUT2-N of the first sub-matrix 2. The first sub-matrix 1 and the second sub-matrix are each configured so that phase differences then produced at the output terminals OUT1-1 to OUT1-N upon selecting the input terminals IN1-1 to IN1-N of the first sub-matrix 1 and phase differences produced at the output terminals OUT2-1 to OUT2-N upon selecting the input terminals IN2-1 to IN2-N of the second sub-matrix 2 will be all different phase differences. Thus, upon selecting any one terminal of 2N input terminals IN1-1 to IN1-N and IN2-1 to IN2-N, a phase difference between terminals of a signal that is output at the final output terminals OUT1 to OUTN will be each different phase difference according to a selected input terminal.

Because the aggregate number of input terminals of the first sub-matrix 1 and the second sub-matrix 2 is twice as much as the number of the final output terminals, it is possible to increase a phase resolution, twice as much as the phase resolution obtained by the Butler matrix having the same number of output terminals as input terminals in the comparison example in FIG. 5.

According to the embodiment herein, by configuring a Butler matrix to have two sub-matrices capable of outputting signals having each different phase difference between output terminals and combine the outputs of these matrices by the adders, it is possible to increase a resolution of phase differences produced between final output terminals twice as much as the resolution obtained by the Butler matrix having the same number of output terminals as input terminals in the comparison example in FIG. 5.

Because the output terminals of the Butler matrix are connected to the respective antenna elements in a beam forming antenna, it is possible to control phase differences between antenna elements for signals which are radiated from the respective antennas at high resolution. In other words, it is possible to control directivity directions of a beam forming antenna at higher resolution.

Example 1

Figure 9:
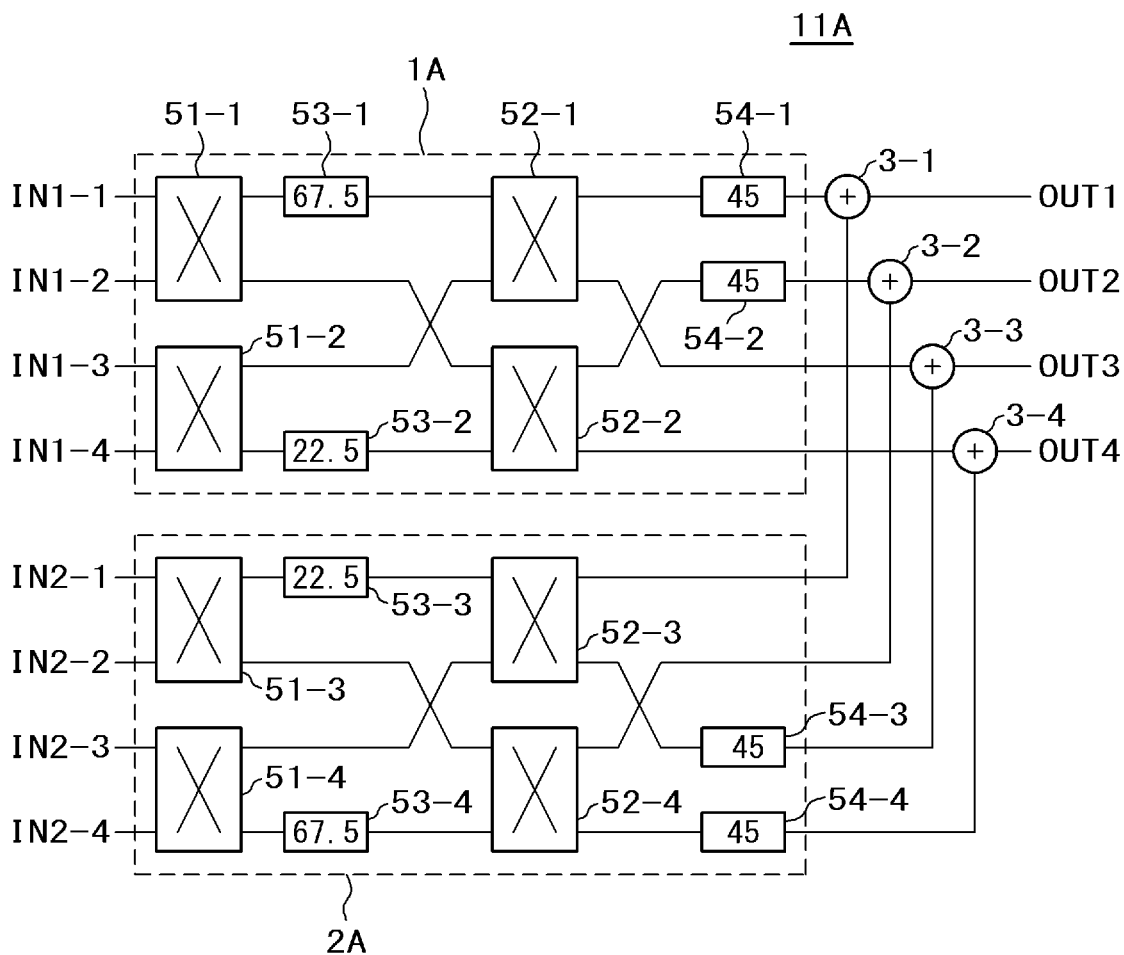
FIG. 9 is a diagram depicting a configuration of a Butler matrix of Example 1.

A first example of the embodiment herein is described with FIG. 9. FIG. 9(A) is a diagram depicting a configuration of a Butler matrix of Example 1. FIG. 9(B) is a diagram representing a relation between an input terminal that is selected and a phase difference produced between output terminals when the selection was made with regard to the Butler matrix in FIG. 9(A).

The present example is an example of a Butler matrix with four output terminals and having eight input terminals, twice as much as the number of output terminals. A first sub-matrix 1A is comprised of 3 dB hybrid combiners 51-1, 51-2, 52-1, 52-2 and fixed phase shifters 53-1, 53-2, 54-1, 54-2. The 3 dB hybrid combiners 51-1, 51-2, 52-1, 52-2 each have a phase shift of 90 degrees between output terminals of each one. A fixed phase shifter 53-1 is a 67.5-degree phase shifter, a fixed phase shifter 53-2 is a 22.5-degree phase shifter, and fixed phase shifters 54-1, 54-2 are 45-degree phase shifters. Likewise, a second sub-matrix 2A is comprised of 3 dB hybrid combiners 51-3, 51-4, 52-3, 52-4 and fixed phase shifters 53-3, 53-4, 54-3, 54-4. The 3 dB hybrid combiners 51-3, 51-4, 52-3, 52-4 each has a phase shift of 90 degrees between output terminals of each one. A fixed phase shifter 53-3 is a 22.5-degree phase shifter, a fixed phase shifter 53-4 is a 67.5-degree phase shifter, and fixed phase shifters 54-3, 54-4 are 45-degree phase shifters. Outputs of the first sub-matrix 1A and outputs of the second sub-matrix 2A are combined by adders 3-1 to 3-4. As the adders, inter alia, 180-degree hybrid combiners or rat race circuits are used.

While input terminals and output terminals are equal in number in the Butler matrix in the comparison example in FIG. 6, the Butler matrix in the present example has eight input terminals IN1-1 to IN1-4, IN2-1 to IN2-4, while having four output terminals. Because the input terminals are twice as many as four final output terminals OUT1 to OUT4, it is possible to generate eight phase differences between output terminals, twice as much as the number of output terminals. As presented in FIG. 9(B), it is possible to implement control of phase differences between output terminals on a per-45-degree basis in a range from −157.5 degrees to +157.5 degrees even in the case of a Butler matrix with four output terminals. A resolution is obtained that is twice as much as that obtained by the Butler matrix with four output terminals in the comparison example in FIG. 6 where phase differences on a per-90-degree basis are obtained. Because these output terminals are connected to antenna elements, it is possible to control directivity directions of beams more finely in comparison with the beam forming antenna using the Butler matrix with four antenna elements in the comparison example in FIG. 6.

Example 2

Figure 10A:
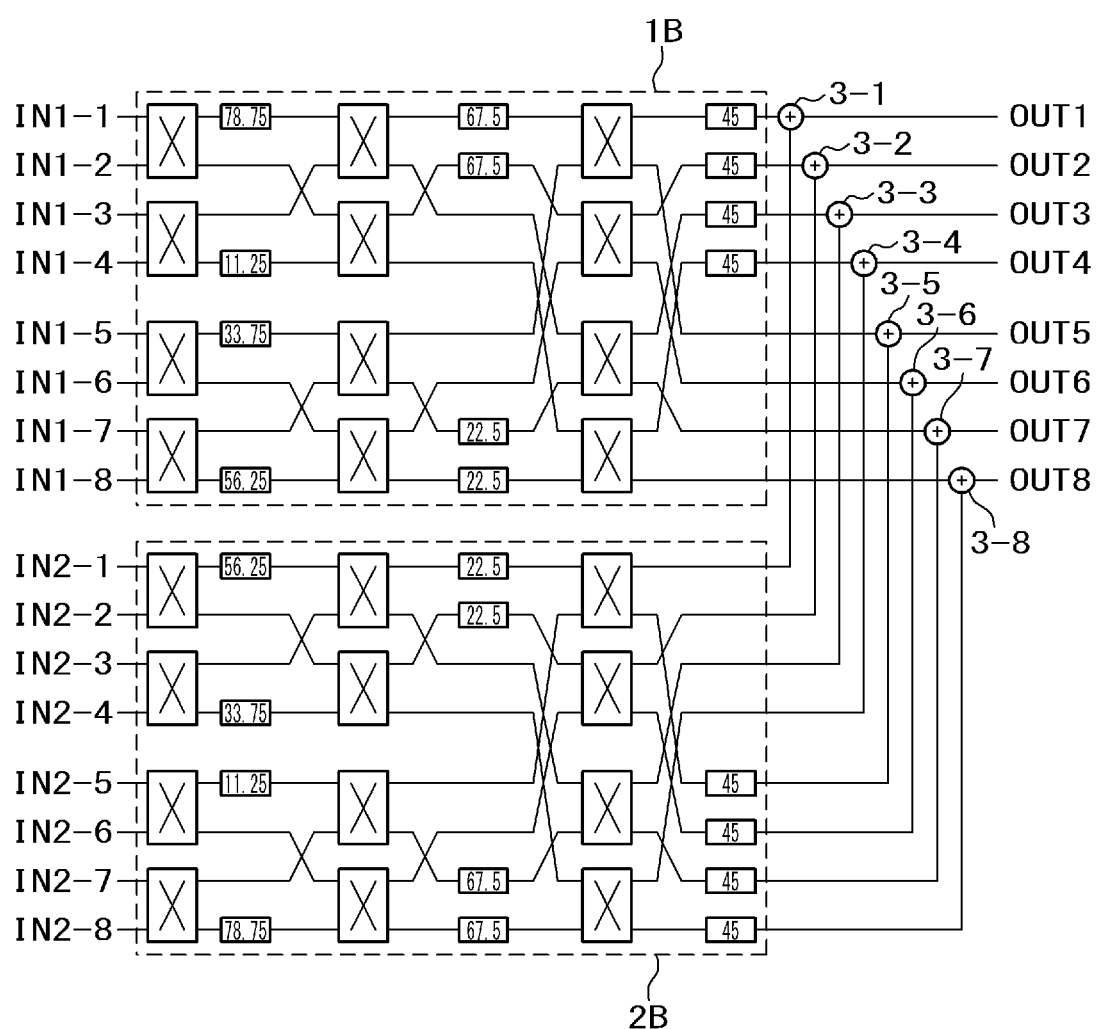
FIG. 10A is a diagram depicting a configuration of a Butler matrix of Example 2.
Figure 10B:
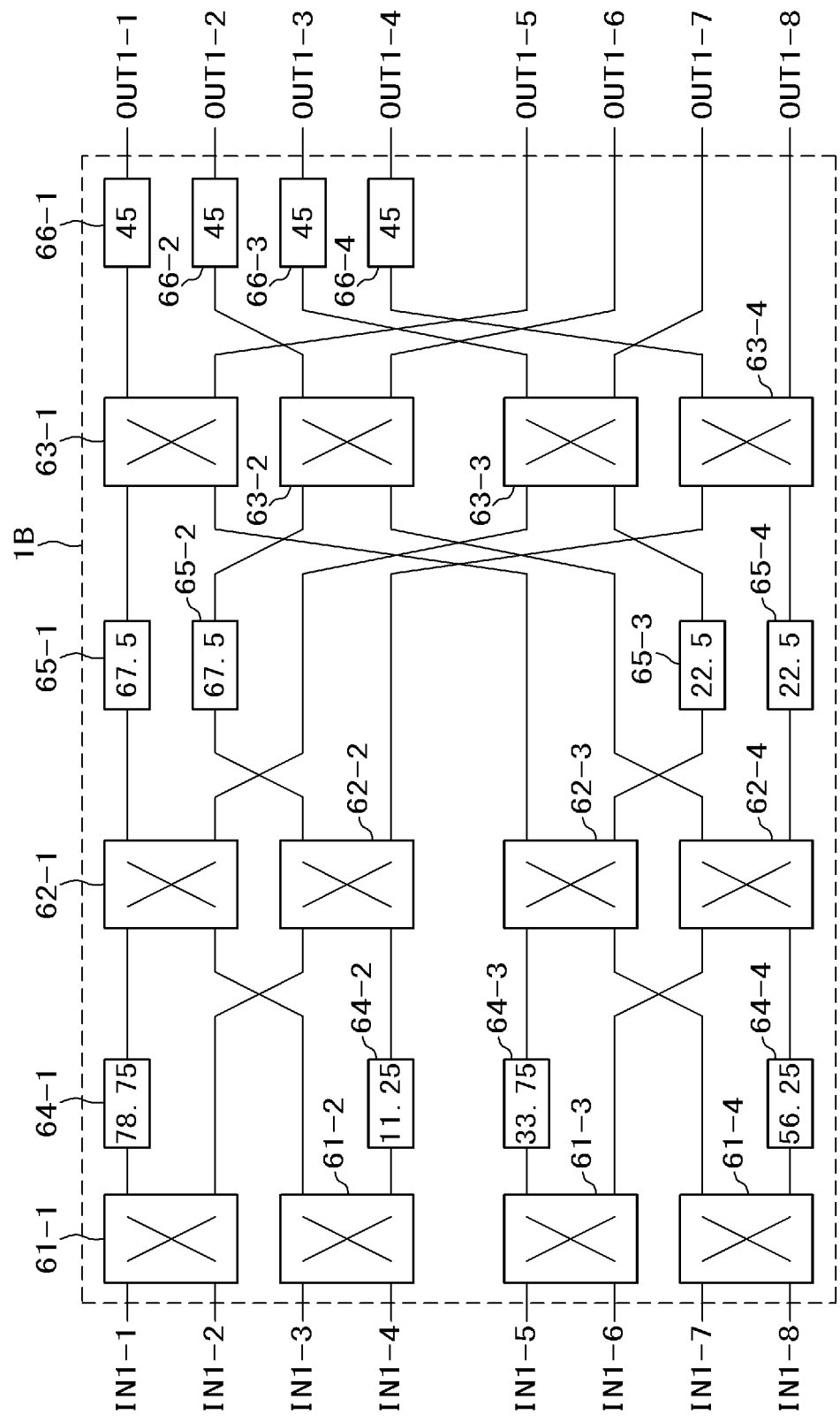
FIG. 10B is a diagram depicting a configuration of a first sub-matrix in FIG. 10A.
Figure 10C:
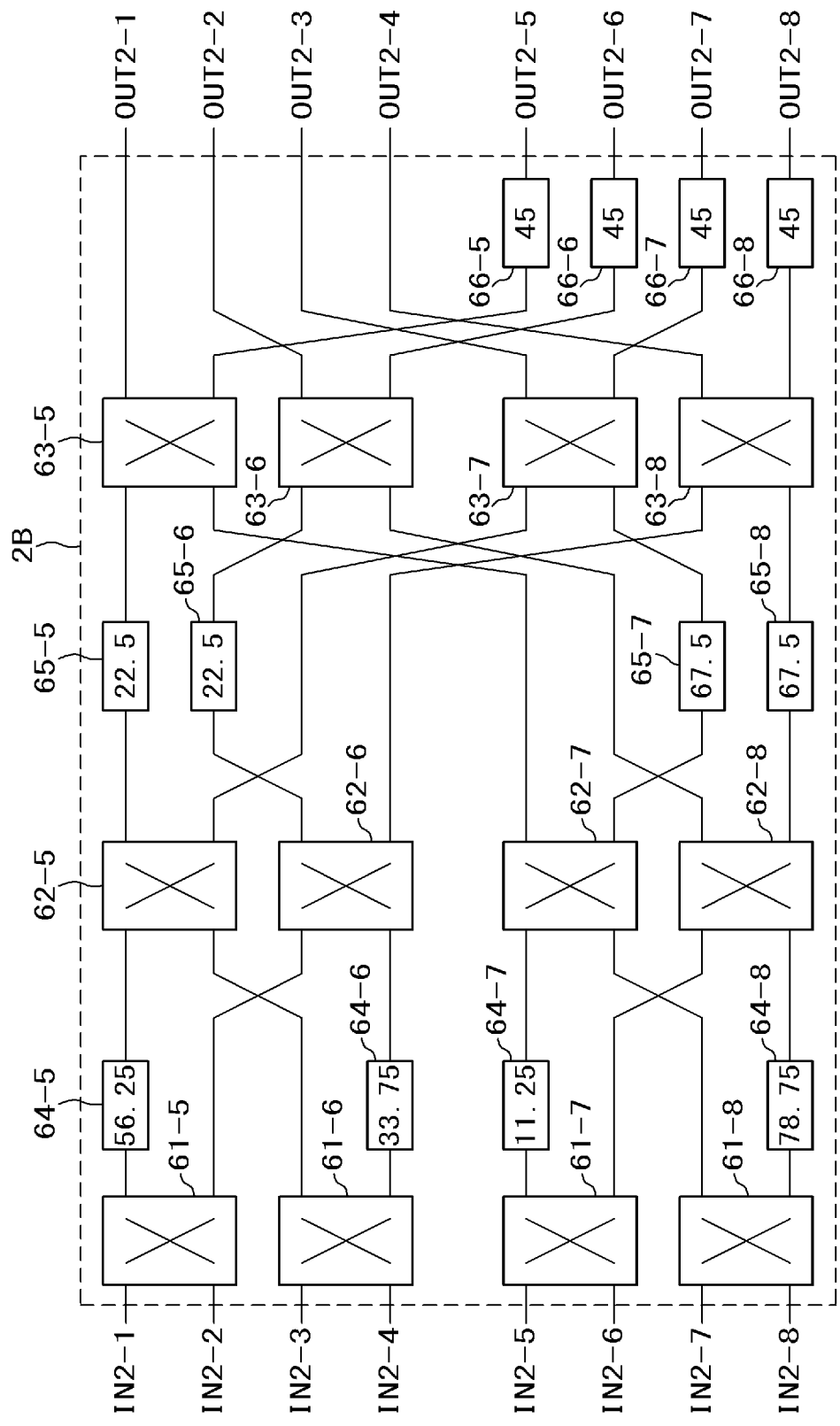
FIG. 10C is a diagram depicting a configuration of a second sub-matrix in FIG. 10A.

A second example of the embodiment herein is described with FIGS. 10A to 10D. FIG. 10A is a diagram depicting a configuration of a Butler matrix of Example 2. FIG. 10B is a diagram depicting a configuration of a first sub-matrix in FIG. 10A. FIG. 10C is a diagram depicting a configuration of a second sub-matrix in FIG. 10A. FIG. 10D is a diagram representing a relation between an input terminal that is selected and a phase difference produced between output terminals when the selection was made with regard to the Butler matrix in FIG. 10A.

The present example is an example of a Butler matrix with eight output terminals and having 16 input terminals, twice as much as the number of output terminals. A first sub-matrix 1B is comprised of 3 dB hybrid combiners 61-1 to 61-4, 62-1 to 62-4, 63-1 to 63-4 and fixed phase shifters 64-1 to 64-4, 65-1 to 65-4, 66-1 to 66-4. The 3 dB hybrid combiners 61-1 to 61-4, 62-1 to 62-4, 63-1 to 63-4 each have a phase shift of 90 degrees between output terminals of each one. A fixed phase shifter 64-1 is a 78.75-degree phase shifter, a fixed phase shifter 64-2 is an 11.25-degree phase shifter, a fixed phase shifter 64-3 is a 33.75-degree phase shifter, a fixed phase shifter 64-4 is a 56.25-degree phase shifter, fixed phase shifters 65-1, 65-2 are 67.5-degree phase shifters, fixed phase shifters 65-3, 65-4 are 22.5-degree phase shifters, and fixed phase shifters 66-1 to 66-4 are 45-degree phase shifters.

A second sub-matrix 2B is comprised of 3 dB hybrid combiners 61-5 to 61-8, 62-5 to 62-8, 63-5 to 63-8 and fixed phase shifters 64-5 to 64-8, 65-5 to 65-8, 66-5 to 66-8. The 3 dB hybrid combiners 61-5 to 61-8, 62-5 to 62-8, 63-5 to 63-8 each have a phase shift of 90 degrees between output terminals of each one. A fixed phase shifter 64-5 is a 56.25-degree phase shifter, a fixed phase shifter 64-6 is a 33.75-degree phase shifter, a fixed phase shifter 64-7 is an 11.25-degree phase shifter, a fixed phase shifter 64-8 is a 78.75-degree phase shifter, fixed phase shifters 65-5, 65-6 are 22.5-degree phase shifters, fixed phase shifters 65-7, 65-8 are 67.5-degree phase shifters, and fixed phase shifters 66-5 to 66-8 are 45-degree phase shifters.

Also, outputs of the first sub-matrix 1B and outputs of the second sub-matrix 2B are combined by adders 3-1 to 3-8 and the Butler matrix is configured to have eight final output terminals OUT1 to OUT8. Because input terminals are 16, twice as many as the eight final output terminals OUT1 to OUT8, it is possible to generate 16 phase differences between output terminals. As presented in FIG. 10D, as phase differences between output terminals, phase differences are obtained on a per-22.5-degree basis in a range from −168.75 degrees to +168.75 degrees even in the case of a Butler matrix with eight output terminals. Therefore, a resolution is obtained that is twice as much as that obtained by the Butler matrix with eight output terminals in the comparison example in FIG. 7 where phase differences on a per-45-degree basis are obtained. Because these output terminals are connected to antenna elements in a beam forming antenna using a Butler matrix, it is possible to control directivity directions of beams more finely in comparison with the beam forming antenna using the Butler matrix with eight antenna elements in the comparison example in FIG. 7.

Example 3

Figure 11:
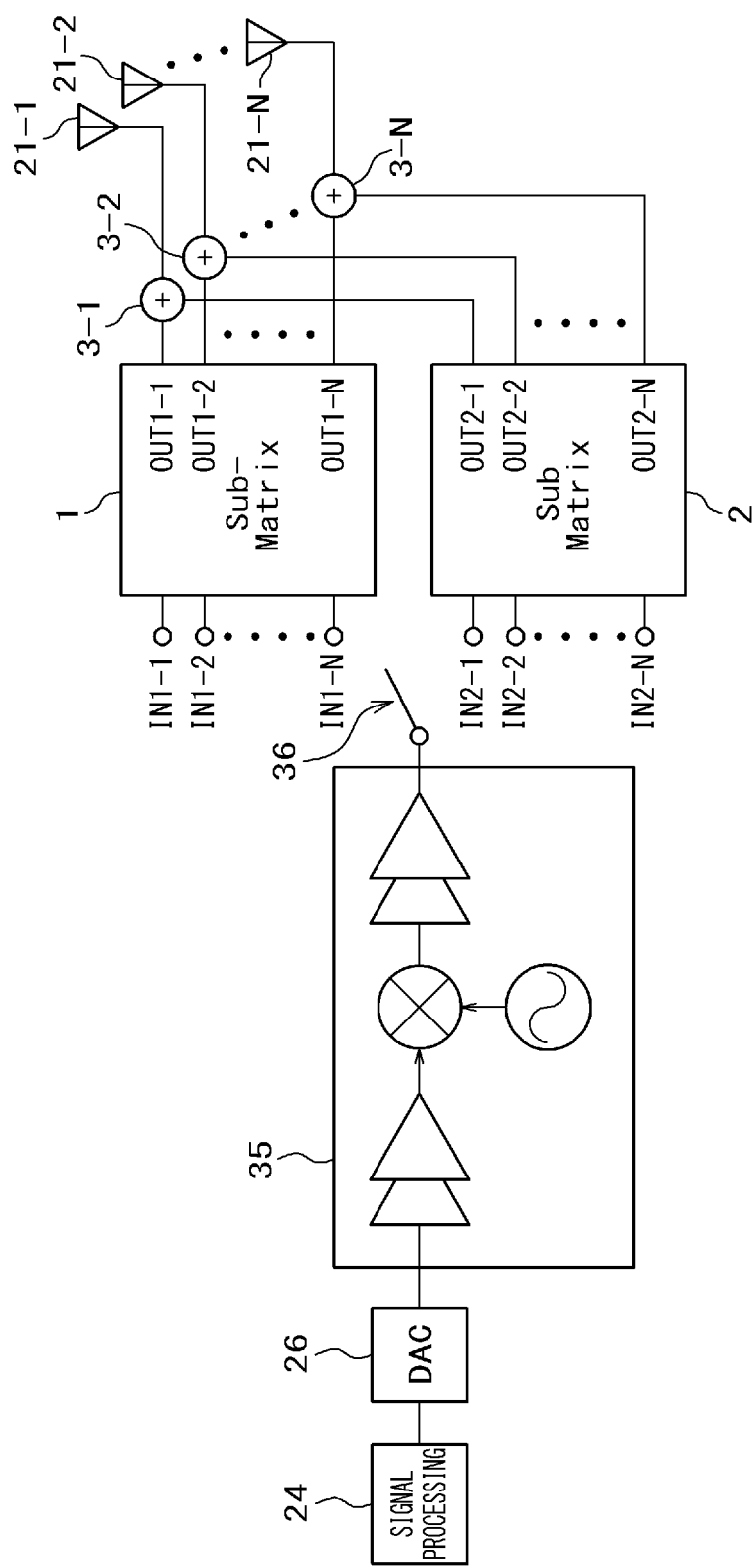
FIG. 11 is a diagram depicting an example of a configuration of a beam forming antenna using the Butler matrix of the embodiment.

One example of a beam forming antenna (Example 3) to which the Butler matrix of the embodiment in FIG. 1 is applied is described with FIG. 11. FIG. 11 is a diagram depicting an example of a configuration of the beam forming antenna to which the Butler matrix of the embodiment in FIG. 1 is applied.

A transmission signal generated in a signal processing circuit 24 is converted by a DA converter 26 and input to a transmitting circuit 35. An output signal from the transmitting circuit 35 is input to a Butler matrix 11, when one input terminal from among multiple input terminals IN1-1 to IN1-N, IN2-1 to IN2-N is selected by a switch 36. At this time, upon selecting any input terminal of the input terminals IN1-1 to IN1-N of the first sub-matrix 1, an output signal is output from the output terminals OUT1-1 to OUT1-N of the first sub-matrix 1; upon selecting any input terminal of the input terminals IN2-1 to IN2-N of the second sub-matrix 2, an output signal is output from the output terminals OUT2-1 to OUT2-N of the second sub-matrix 2. Respective outputs of the first sub-matrix 1 and respective outputs of the second sub-matrix 2 are combined by adders 3-1 to 3-N. Thereby, because a signal having a predetermined phase difference is output from each of antenna elements 21-1 to 21-N, it is possible to form a beam whose directivity direction is controlled according to a selected one of the input terminals IN1-1 to IN1-N, IN2-1 to IN2-N. Because the Butler matrix of the embodiment herein doubles a resolution of phase differences between output terminals, as compared with the Butler matrix having the same number of output terminals as input terminals in the comparison example in FIG. 5, it is possible to control directivity directions more finely according to the present example.

It should be noted that configurations of the first sub-matrix 1 and the second sub-matrix 2 are those as depicted, e.g., in Example 1 of FIG. 9 and Example 2 of FIG. 10A.

Example 4

Figure 12:
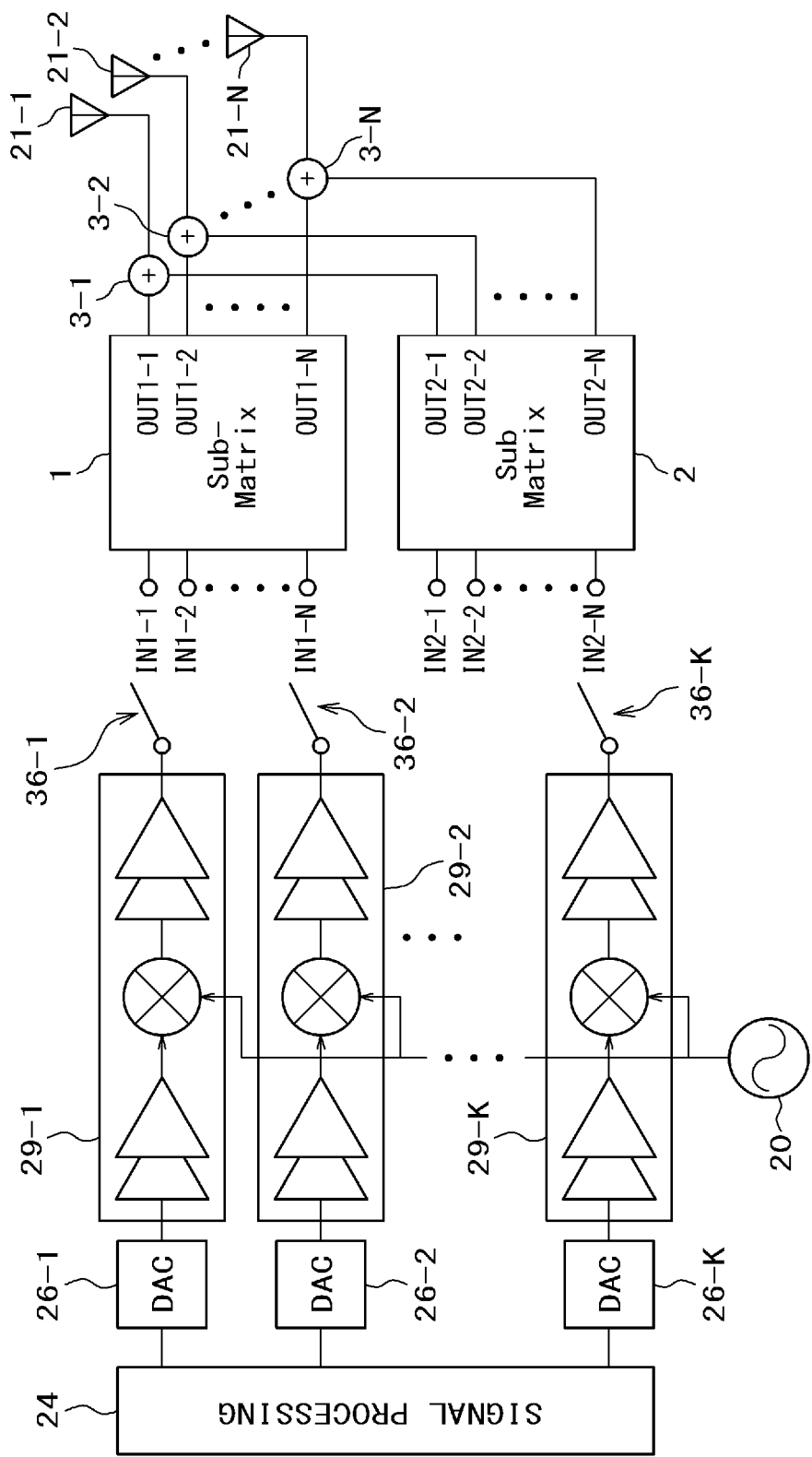
FIG. 12 is a diagram depicting an example of a configuration of a beam forming antenna that radiates beams in different multiple directions using the Butler matrix of the embodiment.

Another example of a beam forming antenna (Example 4) to which the Butler matrix of the embodiment herein is applied is described with FIG. 12. FIG. 12 is a diagram depicting an example of a configuration of the beam forming antenna that radiates beams in different multiple directions using the Butler matrix of the embodiment.

As depicted in FIG. 12, multiple input signals generated by the signal processing circuit 24 pass through transmitting circuits 29-1 to 29-K and are input to input terminals which are individually selected by switches 36-1 to 36-K out of multiple input terminals IN1-I to IN1-N, IN2-1 to IN2-N, so that the signals can be transmitted in multiple directions at the same time. In this case also, as many of the transmitting circuits 29-1 to 29-K to which the signals are input as a foreseeable maximum number (K) of directions of transmission are just required and can be configured in simple circuitry, as compared with circuitry in which, inter alia, analog phase shifters are used. Also, in the present example, it is possible to double the resolution of phase differences between output terminals, as compared with the case of using the Butler matrix having as many output terminals as input terminals in the comparison example in FIG. 5; therefore, it is possible to control directivity directions finely even in the case of transmitting signals in multiple directions at the same time.

It should be noted that configurations of the first sub-matrix 1 and the second sub-matrix 2 are those as depicted, e.g., in Example 1 of FIG. 9 and Example 2 of FIG. 10A.

Now, although the foregoing descriptions have described transmitter circuitry, it is needless to say that the same advantageous effects can be obtained even by application of the Butler matrices of the embodiment herein, Example 1, and Example 2 to a receiver.

While the invention made by the present inventors has been described specifically based on its embodiment and examples hereinbefore, it will be appreciated that the present invention is not limited to the foregoing embodiment and examples, and various modifications may be made thereto.

REFERENCE SIGNS LIST 1, 1A, 1B . . . first sub-matrix, 2, 2A, 2B . . . second sub-matrix, 3-1 to 3-N . . . adder, 11 . . . Butler matrix, 20 . . . carrier generating circuit, 21-1 to 21-N . . . antenna element, 24 . . . signal processing circuit, 25-1 to 25-N20 . . . transmitting circuit, 26 . . . DA converter, 27 . . . mixer, 28 . . . gain element, 29-1 to 29-K . . . transmitting circuit, IN1-1 to IN1-N, IN2-1 to IN2-N . . . input terminal, OUT-1 to OUT-N, OUT1-1 to OUT1-N, OUT2-1 to OUT2-N . . . output terminal, OUT1 to OUTN . . . final output terminal, 35 . . . transmitting circuit, 36 . . . switch, 36-1 to 36-K . . . switch, 51-1 to 51-4, 52-1 to 52-4 . . . 3 dB hybrid combiner, 53-1 to 53-4, 54-1 to 54-4 . . . fixed phase shifter, 61-1 to 61-4, 62-1 to 62-4, 63-1 to 63-4 . . . 3 dB hybrid combiner, 64-1 to 64-4, 65-1 to 65-4, 66-1 to 66-4 . . . fixed phase shifter.

The invention claimed is:

1. A beam forming antenna comprising:
a matrix circuit having multiple final output terminals; and
multiple antenna elements connected to the multiple final output terminals respectively,
the matrix circuit including:
a first sub-matrix which is a Butler matrix having multiple input terminals and multiple output terminals;
a second sub-matrix which is a Butler matrix having multiple input terminals and multiple output terminals; and
adders which combine outputs of the first sub-matrix and outputs of the second sub-matrix,
wherein, by selecting any input terminal out of the multiple input terminals of the first sub-matrix or the multiple input terminals of the second sub-matrix and inputting a signal, a signal having a predetermined phase difference between output terminals is output at the multiple final output terminals and the phase difference between output terminals has a differing value according to a selected input terminal,
wherein when a signal has been input to any one of the multiple input terminals of the first sub-matrix, a signal is output from the multiple output terminals of the first sub-matrix;
wherein when a signal has been input to any one of the multiple input terminals of the second sub-matrix, a signal is output from the multiple output terminals of the second sub-matrix; and
wherein a phase difference between output terminals produced when any one of the multiple input terminals of the first sub-matrix and the multiple input terminals of the second sub-matrix will be one of all different values according to a selected input terminal.

2. The beam forming antenna according to claim 1, wherein the first sub-matrix and the second sub-matrix include 3 dB hybrid combiners and fixed phase shifters.

3. The beam forming antenna according to claim 1, further comprising:
a transmitting circuit; and
a switch to connect an output of the transmitting circuit to any input terminal of the multiple input terminals of the first sub-matrix and the multiple input terminals of the second sub-matrix.

* * * * *